United States Patent [19]

Koenig

[11] 4,158,470
[45] Jun. 19, 1979

[54] SPRING BRAKE HOLD-OFF SYSTEM

[75] Inventor: James P. Koenig, Olmsted Township, Lorain County, Ohio

[73] Assignee: The Bendix Corporation, Southfield, Mich.

[21] Appl. No.: 878,202

[22] Filed: Feb. 16, 1978

[51] Int. Cl.² .............................................. B60T 13/22
[52] U.S. Cl. .................................. 303/71; 137/625.28
[58] Field of Search .......................... 303/50, 71, 9, 13; 137/625.28

[56] References Cited

U.S. PATENT DOCUMENTS 3,166,358  1/1965  Valentine ................................ 303/71

Primary Examiner—Trygve M. Blix
Assistant Examiner—Reinhard J. Eisenzopf
Attorney, Agent, or Firm—Ken C. Decker; William N. Antonis

[57] ABSTRACT

A parking brake control valve for a vehicle fluid pressure braking system is actuable by the vehicle operator to control communication from a fluid pressure source to supply hold-off pressure to the vehicle parking brakes. The parking brakes are of the spring applied, fluid pressure released type, in which the spring actuator automatically effects a mechanical brake operation when hold-off pressure drops below a predetermined level. The parking brake control valve is responsive to a supply pressure below a predetermined level to automatically vent the hold-off pressure from the parking brakes, but this predetermined low pressure is less than the value of the spring brake hold-off pressure below which the brakes are gradually applied or "drag". The valve disclosed in the present application includes a check valve which isolates the hold-off pressure from supply pressure so that the hold-off pressure cannot vent in response to a decrease in the supply level to a sufficiently low value where the brakes may "drag". However, when the supply pressure drops below the predetermined low pressure at which the spring brakes are to be applied, the parking brake control valve automatically vents the hold-off pressure to effect a spring brake application. Consequently, the system disclosed in the present application prevents the spring brakes from "dragging", while retaining the safety feature of automatically applying the spring brakes when the supply pressure drops below the predetermined level.

11 Claims, 1 Drawing Figure

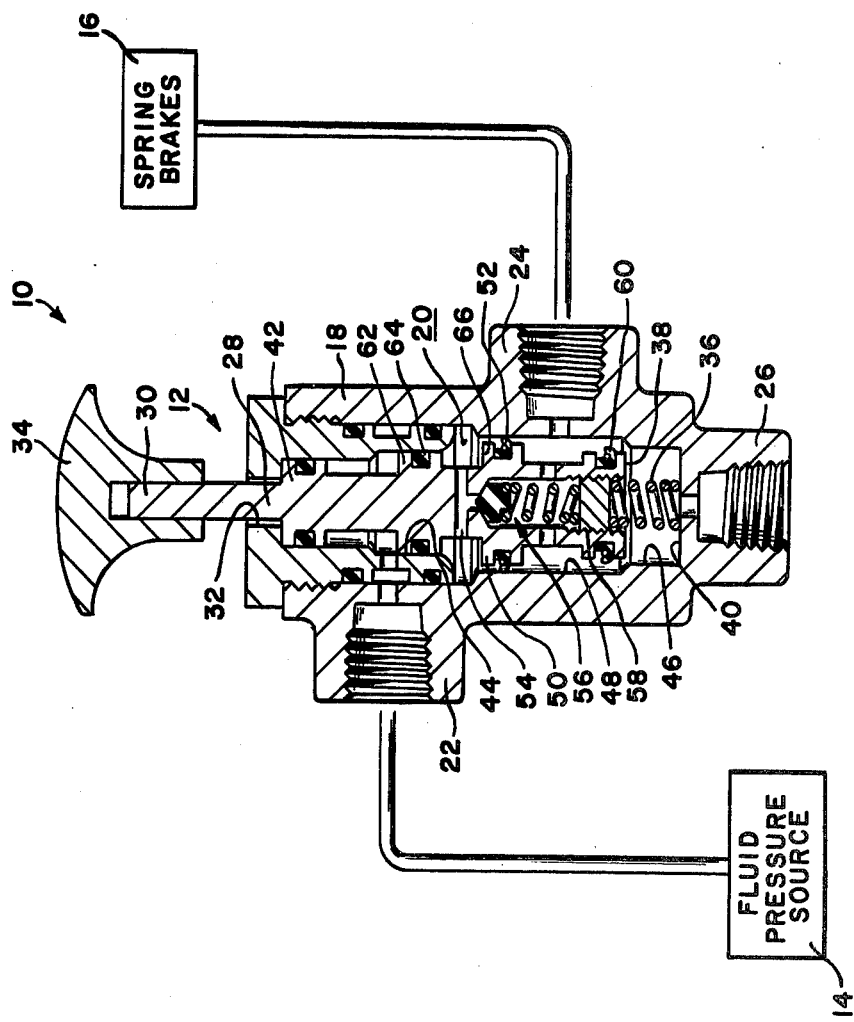

4,158,470

SPRING BRAKE HOLD-OFF SYSTEM

BACKGROUND OF THE INVENTION

This invention relates to a control valve for a fluid pressure parking brake system.

Many modern heavy duty vehicles equipped with air brakes are commonly also equipped with spring applied, fluid pressure released parking brakes, in which hold-off pressure normally supplied to the spring brakes maintains them in a released condition. However, when this hold-off pressure is vented, the spring actuator automatically effects a mechanical brake actuation. Communication of this hold-off pressure to the spring brakes is normally controlled by a manually operated parking brake control valve. Although the valve is normally manually operated, the prior art valves include a safety feature, so that when the supply pressure drops to a predetermined low value, the parking brake control valve automatically exhausts the spring brake hold-off pressure, to thereby automatically effect a mechanical brake application. However, prior art systems of this type suffer a disadvantage inasmuch as the hold-off pressure required to keep the spring brakes from being gradually applied or "dragging" is much higher than predetermined low pressure at which it is no longer safe to operate the vehicle and at which the parking brake control valve automatically vents the spring brakes. Obviously, this slow application or "dragging" of the spring brakes is undesirable, since dragging brakes increase the wear rate thereof, and often result in a dangerous vehicle operating condition. For this reason, it is desirable to prevent the slow application or "dragging" of the spring brakes, while retaining the safety feature of an automatic spring brake application when the fluid pressure level in the system drops to below a predetermined pressure level at which it is no longer safe to operate the vehicle.

SUMMARY OF THE INVENTION

Therefore an important object of my invention is to provide a spring brake parking control system in which spring brake hold-off pressure is maintained until a predetermined low pressure is attained in the system, at which time the hold-off pressure is automatically vented to effect a spring brake application.

Another important object of my invention is to prevent the "dragging" or slow application of spring brakes in a vehicle braking system equipped with mechanically applied, fluid pressure released, spring actuated parking brakes.

Still another important object of my invention is to isolate the supply and delivery pressures across the parking brake control valve used in spring brake systems, so that the pressure at the delivery or outlet port of the parking brake control valve is independent of the pressure level at the supply or inlet port of the parking brake control valve, until the pressure level of the supply or inlet port drops to a predetermined low value, at which time the parking brake control valve automatically vents the pressure at the delivery or outlet port thereof.

DESCRIPTION OF THE DRAWINGS

The sole FIGURE of the drawing is a partial schematic of a vehicle braking system with a parking brake control valve made pursuant to the teachings of my present invention illustrated in cross-section.

DETAILED DESCRIPTION

Referring now to the drawings, a parking brake control system generally indicated by the numeral 10 includes a valve mechanism generally indicated by the numeral 12 which controls fluid communication between a fluid pressure source 14 and the spring applied, fluid pressure released parking brakes generally indicated by the numeral 16. The valve 12 includes a housing 18 which defines a cavity 20 therewithin. A supply or inlet port 22 communicates the cavity 20 with the fluid pressure source 14, a delivery or outlet port 24 communicates the cavity 20 with the spring brakes 16, and an exhaust port 26 communicates the cavity 20 with the ambient atmosphere.

A control valve member generally indicated by the numeral 28 is slidably mounted within the cavity 20, and one end 30 of the member 28 extends through an opening 32 provided in the housing 18 and is fitted with a knob 34. The knob 34 is located on the dash of the vehicle, so that it is available for actuation by the vehicle operator. A spring 36 yieldably urges the control valve member 28 to the first or upper position illustrated in the drawing, but as can be seen, when the vehicle operator applies pressure to the knob 34, the valve member 28 can be forced downwardly to the lower or second position viewing the FIGURE, so that the end 38 of the control valve member 28 engages the end wall 40 of the cavity 20. Seal 42 is carried by the control valve member 28 to prevent air or fluid pressure from escaping through the opening 32 around the portion 30 of the control valve member 28.

The cavity 20 is stepped to define smaller diameter portions 44, 46 and a larger diameter portion 48. Control valve member 28 includes a larger diameter portion 50 which carries an annular seal 52 which slidably and sealingly engages the wall of the larger diameter portion 48 of the cavity 20 throughout the entire range of sliding movement of the control valve member 28. It will be noted that the portion 50 is always disposed between the supply or inlet port 22 and the delivery or outlet port 24, to thereby prevent communication between the ports 22 and 24 around the periphery of the control valve member 28. However, a passage 54 extends through the control valve member 28 to communicate the supply port 22 with the delivery or outlet port 24 as the control valve member 28 is shifted from the first or initial position illustrated in the drawings to the second or lowered position. A spring loaded check valve generally indicated by the numeral 56 permits communication through the passage 54 from the supply or inlet port 22 to the delivery or outlet port 24, but prevents communication in the reverse direction from the delivery or outlet port 24 to the supply or inlet port 22. The control valve member 28 further includes a portion 58 which carries an annular sealing member 60 which, when the control valve member 28 is disposed in the upper position or first position illustrated in the drawing is disposed in the larger portion 48 of the cavity 20, but is adapted to slidingly and sealingly engage the smaller portion 46 of the cavity 20 when the control valve member 28 is moved to the second or lowered position. Still another portion 62 carried by the control valve member 28 carries a seal 64 which slidably and sealingly engages the wall of smaller portion 44 when valve member 28 is in the first position to thereby close supply or inlet port 22, but which is disposed in larger portion 48 of cavity 20 when the valve member 28 is moved to the lower or second position to thereby open supply or inlet port 22. It will also be noted that the portion 50 includes a fluid pressure responsive surface having an effective area 66 which is communicated to the fluid pressure level at the supply or inlet port 22 when the valve member 28 is moved to the second or lowered position. The force of fluid pressure acting on the surface 66 acts in opposition to the force of the spring 36.

MODE OF OPERATION

The various components of the system 10 are illustrated in the drawing in the positions which they assume when the spring parking brakes 16 are applied before the vehicle's engine is started. When the vehicle is to be moved, the vehicle operator starts the engine to thereby charge the fluid pressure source 14 with fluid pressure. It will be noted that, in the condition illustrated in the drawing, the delivery or outlet port 24 is communicated directly to the exhaust port 26, thereby venting the hold-off pressure from the spring brakes 16 to assure that they are in their applied condition while the vehicle is parked. Also, communication through the supply or inlet port 22 is blocked due to the sealing engagement of the portion 62 of the control valve member 28 with the smaller diameter portion 44 of the cavity 20. When the vehicle operator desires to release the spring brakes, the control valve member 28 is forced downwardly viewing the FIGURE toward the second position, so that the portion 58 of the member 28 sealingly engages the smaller diameter portion 46 of the cavity 20, to thereby close the exhaust port 26. As the valve is moved downwardly, the portion 62 of the valve member 28 is moved out of the smaller diameter portion 44 of the cavity 20, to therby permit fluid communication from the supply or inlet port 22 to the outlet or delivery port 24 through the passage 54 and through the check valve 56. The pressure level at the outlet or delivery port 24 is communicated directly to the spring brakes 16, supplying hold-off pressure thereto to maintain them in their released condition.

Assume now that because of some malfunction in the fluid pressure supply to the supply or inlet port 22, that the pressure level at port 22 begins to gradually bleed down. In prior art valves, the hold-off pressure communicated to the spring brakes 16 would also bleed down proportionately, causing the spring brakes to drag, since the point at which the spring brakes begin dragging is at a higher fluid pressure level than that required to cause the spring 36 to force the valve member 28 back into the position illustrated in the drawing. However, because of the check valve 56, even though the pressure at the supply or inlet port 22 will be reduced, the pressure at the delivery or outlet port 24 will be maintained, since this pressure cannot bleed back to the supply port through the check valve 26. When the pressure level at the supply or inlet port 22 drops below some predetermined pressure level such that the force of fluid pressure at the supply or inlet port 22 acting against the effective area 66 generates a force less than the force generated by the spring 36, the spring 36 will force the control valve member 28 into the position illustrated in the drawing, thereby communicating the outlet or delivery port 24 with the exhaust port 26, to thereby vent the hold-off pressure communicated to the spring brakes 16, to effect a spring or mechanical brake actuation.

I claim:

1. Fluid pressure control valve for a fluid pressure system including a fluid pressure source and a pressure responsive device comprising a housing having an inlet communicated to said fluid pressure source, an outlet communicated to said pressure responsive device, and an exhaust, control valve means slidably mounted within said housing and actuable from a first position venting said outlet to said exhaust and closing said inlet to a second position closing said exhaust and communicating the inlet with the outlet, and check valve means controlling communication between the inlet and the outlet when the control valve means is in the second position to permit substantially uninhibited communication from the inlet to the outlet and to prevent communication from the outlet to the inlet, said housing defining a cavity therewithin communicating with said inlet, outlet and exhaust, said control valve means including a portion slidably and sealingly engaging the wall of said cavity between the inlet and outlet to prevent communication therebetween around said control valve means, and passage means within said control valve means extending across said portion so that the inlet and outlet may be communicated through said passage means when the control valve means is in the second position.

2. The invention of claim 1:
wherein said control valve means is manually movable between said first and second positions.

3. The invention of claim 1:
and resilient means yieldably urging said control valve means to said first position.

4. The invention of claim 3:
wherein said control valve means presents a fluid pressure responsive surface having an effective area exposed to the fluid pressure level within said housing and opposing the bias of said resilient means so that the force of fluid pressure acting against said effective area in opposition to said resilient means holds the control valve member in said second position if the fluid pressure level in said housing exceeds a predetermined level, and said resilient means urges said control valve means to said first position when the pressure level in said housing drops below said predetermined level.

5. The invention of claim 1:
wherein said check valve means is located within said passage means.

6. The invention of claim 5:
wherein said control valve means includes another portion slidably and sealingly engaging the wall of said housing when the control valve means is disposed in said first position, said another portion being moved out of sealing engagement with said housing when the control valve means is disposed in said second position.

7. Fluid pressure control valve for a fluid pressure system including a fluid pressure source and a pressure responsive device comprising a housing having an inlet communicated to said fluid pressure source, an outlet communicated to said pressure responsive device, and an exhaust, control valve means slidably mounted within said housing and actuable from a first position venting said outlet to said exhaust and closing said inlet to a second position closing said exhaust and communicating the inlet with the outlet, and check valve means controlling communication between the inlet and the outlet when the control valve means is in the second position to permit substantially uninhibited communication from the inlet to the outlet and to prevent communication from the outlet to the inlet, said housing defining a cavity therewithin communicating with said inlet, said outlet, and said exhaust, said cavity defining larger and smaller diameter portions, said control valve means being slidably mounted in said cavity and having a first portion sealingly engaging the smaller portion of the cavity when the control valve means is in the first position to close said inlet but being urged into the larger portion of the cavity to open said inlet when the valve means is disposed in the second position, a second portion disposed in the larger portion of the cavity to permit communication around the control valve means between the outlet and exhaust when the control valve means is in the first position but sealingly engaging the smaller portion of the cavity to close said exhaust when the control valve means is disposed in the second position, and a third portion slidably and sealingly engaging the wall of the cavity between the inlet and outlet ports as the control valve means is moved from said first position to said second position.

8. The invention of claim 7:
and passage means within said control valve means communicating across the latter to permit communication between the inlet and outlet when the control valve means is disposed in the second position, said check valve means being located in said passage means.

9. Fluid pressure control valve for a fluid pressure system including a fluid pressure source and a pressure responsive device comprising a housing defining a cavity therewithin, an inlet communicating said cavity with said fluid pressure source, an outlet communicating said cavity with said pressure responsive device, and an exhaust communicating with said cavity, control valve means slidably mounted in said cavity and actuable from a first position venting said outlet to said exhaust and closing said inlet to a second position closing said exhaust and communicating the inlet with the outlet, said control valve means including a portion slidably and sealingly engaging the wall of said cavity between the inlet and outlet to prevent communication therebetween around said control valve means, and passage means within said control valve means extending across said portion so that the inlet and outlet may be communicated through said passage means when the control valve means is in the second position.

10. The invention of claim 9:
wherein said control valve means includes another portion slidably and sealingly engaging the wall of said housing when the control valve means is disposed in said first position, said another portion being moved out of sealing engagement with said housing when the control valve means is disposed in said second position.

11. The invention of claim 9:
wherein said cavity is stepped to define larger and smaller diameter portions, said portion of said control valve means slidably and sealingly engaging the larger portion of said cavity, said control valve means further including a first section slidably engaging the smaller portion of the cavity when the control valve means is in the first position to close said inlet but being urged into the larger portion of the cavity to open said inlet when the valve means is disposed in the second position, and a second section disposed in the larger portion of the cavity to permit communication around the control valve means between the outlet and exhaust when the control valve means is in the first position but sealingly engaging the smaller portion of the cavity to close said exhaust when the control valve means is disposed in the second position.

* * * * *